US006033763A

United States Patent [19]

Laprade et al.

[11] Patent Number: 6,033,763

[45] **Date of Patent: *Mar. 7, 2000**

[54] HEAT-TRANSFER LABEL INCLUDING CROSS-LINKED PHENOXY LACQUER LAYER

[75] Inventors: Jean Paul Laprade, North Smithfield, R.I.; James S. Nugent, Hudson, Mass.; Darchun Billy Yang, San Dimas, Calif.

[73] Assignee: Avery Dennison Corporation, Pasadena, Calif.

[ * ] Notice: This patent is subject to a terminal disclaimer.

[21] Appl. No.: 09/093,150

[22] Filed: Jun. 8, 1998

[51] Int. Cl.[7] ........................ B32B 3/00

[52] U.S. Cl. ........................ 428/202; 428/348; 428/349; 428/352

[58] Field of Search ........................ 156/239, 240, 156/289; 428/195, 200, 201, 202, 203, 205, 346, 347, 348, 349, 914, 352

[56] References Cited

U.S. PATENT DOCUMENTS 3,907,974 9/1975 Smith .
3,922,435 11/1975 Asnes .
4,426,422 1/1984 Daniels .
4,548,857 10/1985 Galante .
4,927,709 5/1990 Parker et al. .
4,935,300 6/1990 Parker et al. .
5,766,731 6/1998 Stein et al. .
5,800,656 9/1998 Geurtsen et al. ........................ 156/239
5,824,176 10/1998 Stein et al. .

OTHER PUBLICATIONS

Hawley's Condensed Chemical Dictionary, by Van Nostrand Reinhold Company, New York, 1987.

Technical literature for UCAR Phenoxy Resin PKHH, Union Carbide Corporation, Hackensack NJ, publicity available before the filing of the application.

Technical literature for CYMEL 370, Cytec Industries Inc., West Paterson, NJ, publicity available before the filing of the present application.

*Primary Examiner*—William Krynski
*Assistant Examiner*—Hong J. Xu
*Attorney, Agent, or Firm*—Kriegsman & Kriegsman

[57] ABSTRACT

A heat-transfer label suitable for use in decorating polyethylene-coated glass articles. In a preferred embodiment, the label is capable of withstanding pasteurization conditions on a polyethylene-coated glass article and includes (a) a support portion in the form of a sheet of paper overcoated with a release layer of polyethylene, (b) a skim coat of wax overcoated onto the polyethylene release layer and (c) a transfer portion, the transfer portion including a cross-linked phenoxy protective lacquer layer printed onto the skim coat, a polyester ink layer printed onto the protective lacquer layer, a first adhesive layer printed onto the ink layer and onto any exposed portions of the underlying protective lacquer layer, and a second adhesive layer printed onto the first adhesive layer. The cross-linked phenoxy resin comprises a phenoxy resin of the formula

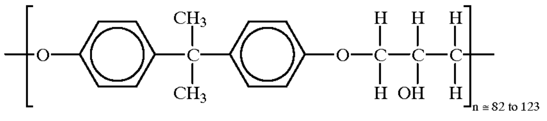

wherein phenoxy resin is cross-linked by a melamine formaldehyde resin. The first adhesive layer preferably comprises an acrylic adhesive resin of the type present in a water-based adhesive dispersion or in a water-based adhesive emulsion and also comprises a surfactant in the form of dioctyl sodium sulfosuccinate. The second adhesive layer preferably comprises a chlorinated polyolefin of the type present in a water-based chlorinated polyolefin dispersion and also comprises a thickener in the form of a polyurethane.

21 Claims, 1 Drawing Sheet

HEAT-TRANSFER LABEL INCLUDING CROSS-LINKED PHENOXY LACQUER LAYER

BACKGROUND OF THE INVENTION

The present invention relates generally to heat-transfer labels and more particularly to a heat-transfer label including a cross-linked phenoxy lacquer layer.

Heat-transfer labels are commonly used in the decorating and/or labelling of commercial articles, such as, and without limitation to, containers for beverages (including alcoholic beverages, such as beer), essential oils, detergents, adverse chemicals, as well as health and beauty aids. As can readily be appreciated, heat-transfer labels are desirably resistant to abrasion and chemical effects in order to avoid a loss of label information and desirably possess good adhesion to the articles to which they are affixed.

One of the earliest types of heat-transfer label is described in U.S. Pat. No. 3,616,015, inventor Kingston, which issued October, 1971, and which is incorporated herein by reference. In the aforementioned patent, there is disclosed a heat-transfer label comprising a paper sheet or web, a wax release layer affixed to the paper sheet, and an ink design layer printed on the wax release layer. In the heat-transfer labelling process, the label-carrying web is subjected to heat, and the label is pressed onto an article with the ink design layer making direct contact with the article. As the paper sheet is subjected to heat, the wax layer begins to melt so that the paper sheet can be released from the ink design layer, a portion of the wax layer being transferred with the ink design layer and a portion of the wax layer remaining with the paper sheet. After transfer of the design to the article, the paper sheet is immediately removed, leaving the design firmly affixed to the article and the wax transferred therewith exposed to the environment. The wax layer is thus intended to serve two purposes: (1) to provide release of the ink design from the web upon application of heat to the web and (2) to form a protective layer over the transferred ink design. After transfer of the label to the article, the transferred wax release layer is typically subjected to a post-flaming technique which enhances the optical clarity of the wax protective layer (thereby enabling the ink design layer therebeneath to be better observed) and which enhances the protective properties of the transferred wax release.

Many heat-transfer labels include, in addition to the layers described above, an adhesive layer (comprising, for example, a polyamide or polyester adhesive) deposited over the ink design to facilitate adhesion of the label onto a receiving article. An example of a heat-transfer label having an adhesive layer is disclosed in U.S. Pat. No. 4,548,857, inventor Galante, which issued Oct. 22, 1985, and which is incorporated herein by reference. Additionally, many heat-transfer labels additionally include a protective lacquer layer interposed between the wax release layer and the ink layer. An example of such a label is disclosed in U.S. Pat. No. 4,426,422, inventor Daniels, which issued Jan. 17, 1984, and which is incorporated herein by reference.

One phenomenon that has been noted with heat-transfer labels of the type described above containing a wax release layer is that, quite often, a degree of hazing or a "halo" is noticeable over the transferred label when the transfer is made onto clear materials. This "halo" effect, which persists despite post-flaming and which may detract from the appearance of the label, is caused by the wax coating around the outer borders of the transferred ink design layer. Hazing due to the wax release layer may also appear in "open-copy" areas of the label, i.e., areas of the label where no ink is present between the adhesive and protective lacquer layers, and also may detract from the appearance of the label.

In addition to and related to the aforementioned problem of hazing, when heat-transfer labels of the type described above are applied to dark-colored containers, the outer wax layer of the label often appears as a whitish coating on the container, which effect is undesirable in many instances. Furthermore, scratches and similar abrasions to the outer wax layer of the label can occur easily and are readily detectable.

Accordingly, to address the aforementioned issues, considerable effort has been expended in replacing or obviating the need for a wax release layer. One such wax-less, heat-transfer label is disclosed in U.S. Pat. No. 3,922,435, inventor Asnes, which issued Nov. 25, 1975, and which is incorporated herein by reference. In the aforementioned patent, the layer of wax is replaced with a layer of a non-wax resin. This non-wax resinous layer is referred to in the patent as a dry release since it does not transfer to the article along with the ink design layer. In a preferred embodiment of the patent, the non-wax resinous layer comprises a thermoset polymeric resin, such as cross-linked resins selected from the group consisting of acrylic resins, polyamide resins, polyester resins, vinyl resins and epoxy resins.

Another example of a wax-less, heat-transfer label is disclosed in U.S. Pat. No. 4,935,300, inventors Parker et al., which issued Jun. 19, 1990, and which is incorporated herein by reference. In the aforementioned patent, the label, which is said to be particularly well-suited for use on high density polyethylene, polypropylene, polystyrene, polyvinylchloride and polyethylene terephthalate surfaces or containers, comprises a paper carrier web which is overcoated with a layer of polyethylene. A protective lacquer layer comprising a polyester resin and a relatively small amount of a non-drying oil is printed onto the polyethylene layer. An ink design layer comprising a resinous binder base selected from the group consisting of polyvinylchloride, acrylics, polyamides and nitrocellulose is then printed onto the protective lacquer layer. A heat-activatable adhesive layer comprising a thermoplastic polyamide adhesive is then printed onto the ink design layer.

Although the above-described wax-less, heat-transfer label substantially reduces the wax-related effects discussed previously, said label does not quite possess the same release characteristics of heat-transfer labels containing a wax release layer. Accordingly, another type of heat-transfer label differs from the heat-transfer label disclosed in U.S. Pat. No. 4,935,300, only in that a very thin layer or "skim coat" of a waxlike material is interposed between the polyethylene release layer and the protective lacquer layer to improve the release of the protective lacquer from the polyethylene-coated carrier web. The thickness of the skim coat corresponds to approximately 0.1–0.4 lbs. of the waxlike material spread onto about 3000 square feet of the polyethylene release layer.

An example of the aforementioned type of heat-transfer label, which has been sold by the assignee of the present application for use in labelling polypropylene bottle caps, comprises a paper carrier web overcoated with a layer of polyethylene. A skim coat is overcoated on the polyethylene layer. A protective lacquer layer comprising vinyl and polyester resins is printed onto the skim coat. An ink design layer comprising vinyl and polyester resins is printed onto the protective lacquer layer. A heat-activatable adhesive layer comprising an acrylic resin, a solvent-soluble chlorinated polypropylene and a plasticizer is printed over the ink design and protective lacquer layers. The acrylic resin is a butyl methacrylate resin, such as ELVACITE® 2045, which is commercially available from ICI Acrylics Inc. (Wilmington, Del.). The solvent-soluble chlorinated polypropylene is commercially available from Eastman Chemical Products, Inc. (Kingsport, Tenn.) as chlorinated polyolefin CP-343-1. The plasticizer is a glyceryl tribenzoate, such as BENZOFLEX® S-404, which is commercially available from Velsicol Chemical Corporation (Chicago, Ill.).

In commonly-assigned, U.S. Pat. No. 5,766,731, which is incorporated herein by reference, there is disclosed a heat-transfer label that is said to be particularly well-suited for use in decorating styrene-acrylonitrile surfaces and containers. Said label includes a support portion comprising a sheet of paper overcoated with a release layer of polyethylene. The polyethylene layer of the support portion is overcoated with a skim coat of wax. A protective lacquer layer comprising a methyl/n-butyl methacrylate copolymer and a methyl methacrylate copolymer is printed onto the skim coat. An ink layer comprising a polyamide and/or acrylic ink is printed onto the protective lacquer layer. An adhesive layer comprising Eastman CP-343-1 solvent-soluble chlorinated polypropylene, a butyl methacrylate resin and glycerol tribenzoate is printed over the ink design and protective lacquer layers.

In commonly-assigned, U.S. Pat. No. 5,908,694, which is incorporated herein by reference, there is disclosed a heat-transfer label that is said to be particularly well-suited for use in decorating untreated high-density and low-density polyethylene containers. Said label includes a support portion, said support portion preferably comprising a paper carrier web. A wax release layer is overcoated on top of the support portion. A protective lacquer layer is printed onto the wax release layer, the protective lacquer layer comprising a hard polyester or acrylic resin, as well as Eastman CP-343-1 solvent-soluble chlorinated polypropylene. An ink design layer comprising an acrylic ink is printed onto the protective lacquer layer. An adhesive layer is printed over the ink design and protective lacquer layers, said adhesive layer comprising a soft polyamide resin, Eastman CP-153-2 solvent-soluble chlorinated polyethylene, ethylene vinyl acetate and erucamide. The aforementioned patent application also discloses a heat-transfer label that is said to be particularly well-suited for use in decorating untreated high-density polyethylene containers. Said label includes a support portion, said support portion comprising a sheet of paper overcoated with a release layer of polyethylene. The polyethylene layer of the support portion is overcoated with a skim coat of wax. A protective lacquer layer is printed onto the skim coat, the protective lacquer layer comprising a hard polyester resin and an ethoxylated alcohol or a like release agent. An ink design layer comprising a polyamide ink is printed onto the protective lacquer layer, and an adhesive layer of the type described above is printed over the ink and protective lacquer layers.

Incommonly-assigned, U.S. Pat. No. 5,932,319, which is incorporated herein by reference, there is disclosed a heat-transfer label that is said to be particularly well-suited for use in decorating treated low-density polyethylene surfaces. Said label includes a sheet of paper overcoated with a wax release layer. A protective lacquer layer is printed onto the wax release layer, said protective lacquer layer comprising a pair of cross-linked polyester resins and a cross-linked vinyl resin. One of the two cross-linked polyester resins preferably comprises a polyester resin of the type commercially available as ViTEL® 2300 polyester resin and a cross-linking agent in the form of CYMEL 303 hexamethoxymethylmelamine resin. The other of the two cross-linked polyester resins preferably comprises a polyester resin of the type commercially available as ViTEL® 5545 polyester resin and a cross-linking agent in the form of CYMEL 303 hexamethoxymethylmelamine resin. The cross-linked vinyl resin preferably comprises a vinyl resin of the type commercially available as VAGH vinyl resin and a cross-linking agent in the form of CYMEL 303 hexamethoxymethylmelamine resin.

Other patents and publications of interest relating to the use of heat-transfer labels include U.S. Pat. No. 4,927,709, inventors Parker et al., which issued May 22, 1990; PCT Application No. PCT/US97/11309, published Jan. 8, 1998; and PCT Application No. PCT/US97/11495, published Jan. 8, 1998, all of which are incorporated herein by reference.

As evident from the above discussion, different types of heat-transfer labels have been used to decorate a variety of different container types, including various types of plastic containers, certain metal containers and, as hereinafter explained, certain glass containers.

Historically, glass containers have been pre-treated (typically by the container manufacturer) with a "coating" of oleic acid or stearate, whose function is to enhance the abrasion resistance and lubricity of the containers so as to minimize damage (i.e., scratching, breaking) to the containers during the filling, labelling and shipping processes to which they are later subjected. Such lubricant-coated containers are typically treated, prior to decoration, with a silane adhesion promoter of the type described in U.S. Pat. No. 3,907,974, inventor Smith, which issued Sep. 23, 1975 and which is incorporated herein by reference. The reason for silane treatment is that, in the absence thereof, the adhesive layer of the heat-transfer label does not adhere adequately to the lubricant-coated glass. By contrast, the silane adhesion promoter has two functional groups, one of the functional groups being capable of covalently bonding the lubricant-coated glass and the other functional group being capable of covalently bonding the adhesive layer of the heat-transfer label. In this manner, a covalent bond, albeit through the silane adhesion promoter, is formed between the adhesive layer of the heat-transfer label and the lubricant-coated glass.

Over the last several years, an increasing number of manufacturers of glass containers have begun using polyethylene, instead of stearate or oleic acid, as a lubricant for glass containers. This is because polyethylene has been found to provide glass containers with greater lubricity than is provided by stearate or oleic acid. The increased lubricity provided by polyethylene, in turn, enables the manufacture and use of thinner-walled glass containers—a financial savings to glass manufacturers.

Typically, the application of polyethylene to a glass container is accomplished by spraying a polyethylene emulsion (e.g., DURACOAT polyethylene emulsion, commercially available from Sun Chemical) onto the glass container soon after the container has been formed and while the container is in the process of cooling (e.g., when the container has cooled to about 200–250° F.). The actual amount of polyethylene emulsion sprayed onto the container is typically quite small—on the order of approximately 0.006 mg/container. Moreover, because spraying is the typical method of applying the polyethylene emulsion to the glass container, there will often be a lack of uniformity (or even an occasional bare spot or two) in the polyethylene coating formed on the glass container.

At present, approximately 90% of all glass containers manufactured domestically are treated with a polyethylene lubricant. Polyethylene-coated glass containers, however, cannot be decorated with existing heat-transfer labels due to a lack of adhesion between the heat-transfer label and the polyethylene-coated glass container. Moreover, this lack of adhesion between the heat-transfer label and the polyethylene-coated glass container cannot be ameliorated satisfactorily by silane-treatment of the polyethylene-coated glass container.

In commonly-assigned, U.S. Pat. No. 5,800,656, inventors Geurtsen et al., which is incorporated herein by reference, there is disclosed a heat-transfer label, said heat-transfer label including a phenoxy protective lacquer layer. In one embodiment, said label is said to be well-suited for use in decorating silane-treated glass containers, said label including a support portion comprising a sheet of paper overcoated with a release layer of polyethylene. The polyethylene layer of the support portion is overcoated with a skim coat of wax. A phenoxy protective lacquer layer is printed onto the skim coat, the phenoxy protective lacquer layer preferably comprising the PKHH grade of UCAR® phenoxy resin. An ink design layer is printed over the phenoxy protective lacquer layer, said ink design layer comprising a polyester/vinyl ink, a polyamide ink, an acrylic ink and/or a polyester ink. An adhesive layer is printed over the ink design layer, any exposed portions of the protective lacquer layer and a surrounding area of the skim coat, said adhesive layer comprising an acrylic adhesive of the type present in a water-based adhesive emulsion or a water-based adhesive dispersion (e.g., RHOPLEX® GL-618 emulsion) and a surface tension lowering agent (e.g., Triton® X114 nonionic surfactant).

The above patent application also discloses that the aforementioned label can be used to decorate aluminum cans of the type that have been treated with a highly-lubricating thermoset acrylic coating or varnish.

SUMMARY OF THE INVENTION

Although heat-transfer labels containing a phenoxy protective lacquer layer have been used by the present assignee to decorate a variety of container types and have exhibited many desirable properties, the present inventors have noted that such labels do not exhibit optimal performance in terms of resistance to scuff (i.e., abrasion), chemical degradation and hazing (hazing believed by the present inventors to be due to the migration of wax from the skim coat and/or atmospheric water into the protective lacquer layer when the transfer portion of the label is subjected to heat).

It is, therefore, an object of the present invention to provide a heat-transfer label comprising a new phenoxy protective lacquer layer.

According to one aspect of the present invention, there is provided a heat-transfer label, said heat-transfer label comprising (a) a support portion; and (b) a transfer portion over said support portion for transfer of the transfer portion from the support portion to an article upon application of heat to the support portion while the transfer portion is placed into contact with the article, said transfer portion comprising (i) a protective lacquer layer, said protective lacquer layer comprising a cross-linked phenoxy resin; (ii) an ink layer over said protective lacquer layer; and (iii) a first adhesive layer over said ink and protective lacquer layers. Preferably, the aforementioned heat-transfer label further comprises a waxlike skim coat, said waxlike skim coat being interposed between said support portion and said transfer portion.

Preferably, said cross-linked phenoxy resin is made by cross-linking a phenoxy resin of the following chemical formula:

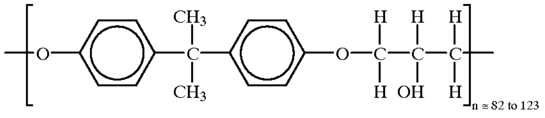

wherein said cross-linking preferably comprises using a melamine formaldehyde resin.

The aforementioned label can be used to decorate a variety of different container types and exhibits improved resistance to scuff, chemical degradation and hazing, as compared to corresponding heat-transfer labels containing a comparable non-cross-linked phenoxy protective lacquer layer.

In those instances in which the aforementioned heat-transfer label is used to decorate polyethylene-coated glass articles (especially polyethylene-coated glass articles subjected to pasteurization conditions, such as beer containers in which the beer is pasteurized while in the container), said ink design layer preferably comprises a polyester ink, said heat-transfer label preferably further including a second adhesive layer over said first adhesive layer, said first adhesive layer preferably comprising a surfactant in the form of dioctyl sodium sulfosuccinate and an acrylic resin of the type present in a water-based acrylic adhesive dispersion or water-based acrylic adhesive emulsion, said second adhesive layer preferably comprising a chlorinated polyolefin. Preferably, said chlorinated polyolefin is of the type present in a water-based chlorinated polyolefin dispersion, said water-based chlorinated polyolefin dispersion preferably having a pH at 25° C. of 9–10 and containing 2-amino-2-methyl-1-propanol as a neutralizing amine, said water-based chlorinated polyolefin dispersion preferably containing 20%, by weight, chlorinated polyolefin and 25%, by weight, total solids. In addition to said chlorinated polyolefin, said second adhesive layer preferably further comprises a thickener, said thickener preferably being a polyurethane.

Alternatively, the first and second adhesive layers described above could be replaced with a single adhesive layer comprising said acrylic adhesive resin and said chlorinated polyolefin-containing adhesive layer, or said second adhesive layer could be eliminated, with said chlorinated polyolefin being applied to the polyethylene-coated glass as a primer (or, in the case of uncoated glass, as a cold-end treatment).

According to another aspect of the invention, there is provided a transfer portion of a heat-transfer label, said transfer portion comprising (a) a protective lacquer layer, said protective lacquer layer comprising a cross-linked phenoxy resin; and (b) an ink design layer positioned over said protective lacquer layer. Preferably, said cross-linked phenoxy resin is made by cross-linking a phenoxy resin of the following chemical formula:

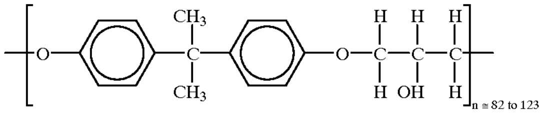

wherein said cross-linking preferably comprises using a melamine formaldehyde resin. In addition, said transfer portion preferably further comprises a first adhesive layer positioned over said ink design layer.

In those instances in which the aforementioned transfer portion is applied to polyethylene-coated glass articles (especially polyethylene-coated glass articles subjected to pasteurization conditions), said ink layer preferably comprises a polyester ink, said transfer portion preferably further comprising a second adhesive layer over said first adhesive layer, said first adhesive layer preferably comprising an acrylic adhesive resin of the type present in a water-based adhesive emulsion or in a water-based adhesive dispersion, said second adhesive layer comprising a water-dispersible chlorinated polyolefin. Preferably, said water-dispersible chlorinated polyolefin is of the type present in a water-based chlorinated polyolefin dispersion having a pH at 25° C. of 9–10 and containing 2-amino-2-methyl-1-propanol as a neutralizing amine, said water-based chlorinated polyolefin dispersion containing 20%, by weight, chlorinated polyolefin and 25%, by weight, total solids.

Alternatively, the first and second adhesive layers described above could be replaced with a single adhesive layer comprising said acrylic adhesive resin and said chlorinated polyolefin-containing adhesive layer, or said second adhesive layer could be eliminated, with said chlorinated polyolefin being applied to the polyethylene-coated glass as a primer (or, in the case of uncoated glass, as a cold-end treatment).

In addition to being directed to the above-described heat-transfer labels and transfer portions of heat-transfer labels, the present invention is also directed to methods of making said heat-transfer labels and transfer portions, as well as to the compositions used to form the various constituent layers of said heat-transfer labels and transfer portions.

Moreover, the present invention is also directed to a novel method of decorating an article, said method comprising the steps of (a) providing a heat-transfer label, said heat-transfer label comprising (i) a support portion, and (ii) a transfer portion over said support portion for transfer of the transfer portion from the support portion to the article upon application of heat to the support portion while the transfer portion is placed into contact with the article, said transfer portion comprising a protective lacquer layer, said protective lacquer layer comprising a cross-linked phenoxy resin, and an ink design layer, said ink design layer being positioned over said protective lacquer layer; and (b) transferring said transfer portion from said support portion to the article.

In those instances in which the article is a polyethylene-coated glass article, said article is preferably not silane-treated prior to said transferring step. Moreover, in those instances in which the polyethylene-coated glass article is subjected to pasteurization conditions, said ink design layer preferably comprises a polyester ink and said transfer portion preferably further comprises a first adhesive layer over said ink and protective lacquer layers and a second adhesive layer over said first adhesive layer, said first adhesive layer comprising an acrylic adhesive resin of the type present in a water-based adhesive emulsion or in a water-based adhesive dispersion, said second adhesive layer comprising a chlorinated polyolefin, said chlorinated polyolefin preferably being of the type present in a water-based chlorinated polyolefin dispersion having a pH at 25° C. of 9–10 and containing 2-amino-2-methyl-1-propanol as a neutralizing amine, said water-based chlorinated polyolefin dispersion containing 20%, by weight, chlorinated polyolefin and 25%, by weight, total solids.

Alternatively, the first and second adhesive layers described above could be replaced with a single adhesive layer comprising said acrylic adhesive resin and said chlorinated polyolefin-containing adhesive layer, or said second adhesive layer could be eliminated, with said chlorinated polyolefin being applied to the polyethylene-coated glass as a primer (or, in the case of uncoated glass, as a cold-end treatment).

For purposes of the present specification and claims, it is to be understood that certain terms used herein, such as "on" or "over," when used to denote the relative positions of two or more layers of a heat-transfer label, are primarily used to denote such relative positions in the context of how those layers are situated prior to transfer of the transfer portion of the label to an article since, after transfer, the arrangement of layers is inverted as those layers which were furthest removed from the associated support sheet are now closest to the labelled article.

Additional objects, as well as features, advantages and aspects of the present invention, will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate preferred embodiments of the invention and, together with the description, serve to explain the principles of the invention. In the drawings wherein like reference numerals represent like parts.

DETAILED DESCRIPTION OF PREFERRED EMBODIMENTS

As noted above, there exists a need for a heat-transfer label whose protective lacquer layer exhibits improved resistance to scuff, chemical degradation and/or hazing, as compared to existing heat-transfer labels comprising a phenoxy protective lacquer layer. Such a protective lacquer layer is also desirably compatible with a wide range of materials used to form adhesive and ink layers and can be used in heat-transfer labels to decorate many different types of articles.

Figure 1:
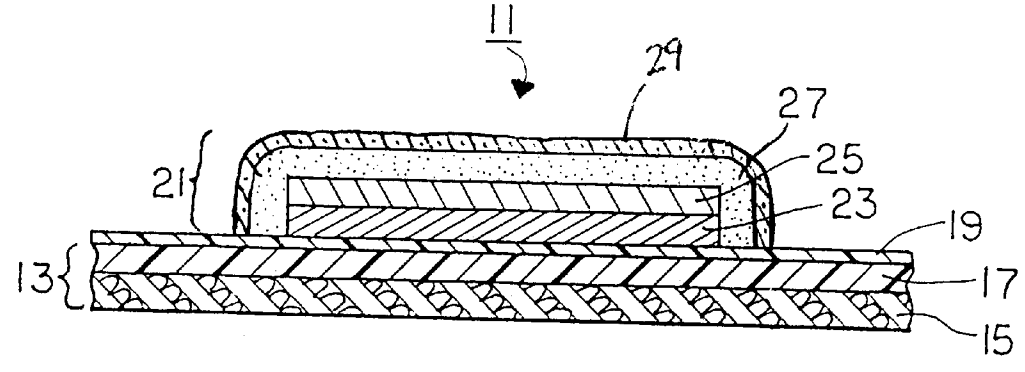
FIG. 1 is a schematic section view of a first embodiment of a heat-transfer label that is particularly well-suited for, but not limited to, use in decorating polyethylene-coated glass containers of the type that are subjected to pasteurization conditions, the heat-transfer label being constructed according to the teachings of the present invention.

Referring now to FIG. 1, there is shown a schematic section view of a first embodiment of a heat-transfer label that is particularly well-suited for use in, but is not limited to, decorating polyethylene-coated glass containers of the type that are subjected to pasteurization conditions, the heat-transfer label being constructed according to the teachings of the present invention and being represented generally by reference numeral 11.

Label 11 comprises a support portion 13. Support portion 13, in turn, comprises a carrier web 15 overcoated with a polyethylene layer 17. Carrier web 15 is typically made of paper or a similarly suitable substrate. Details of polyethylene layer 17 are disclosed in U.S. Pat. Nos. 4,935,300 and 4,927,709, the disclosures of which, as noted above, are incorporated herein by reference.

Label 11 also comprises a skim coat 19 of the type described above, said skim coat being coated directly on top of the entirety of polyethylene layer 17. During label transfer, a portion of skim coat 19 is typically transferred along with the transfer portion of label 11 onto the article being decorated, and a portion of skim coat 19 remains on top of polyethylene layer 17.

Label 11 further comprises a transfer portion 21. Transfer portion 21, in turn, includes (i) a protective lacquer layer 23 printed directly on top of a portion of skim coat 19, (ii) an ink design layer 25 printed onto a desired area of lacquer layer 23, (iii) a first heat-activatable adhesive layer 27 printed onto design layer 25, any exposed portions of lacquer layer 23 and a surrounding portion of skim coat 19, and (iv) a second heat-activatable adhesive layer 29 printed onto first adhesive layer 27.

Protective lacquer layer 23 comprises a cross-linked phenoxy lacquer resin. Examples of phenoxy lacquer resins suitable for use in the aforementioned cross-linked phenoxy resin include the UCAR® Phenoxy Resins (Union Carbide Corporation, Hackensack, N.J.), which have the following chemical structure:

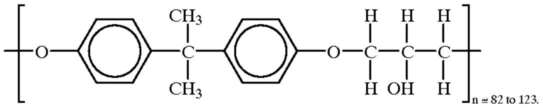

A particularly preferred UCAR® Phenoxy Resin is PKHH, a medium weight grade of the above structure which, at 40% solids, by weight, in methyl ethyl ketone (MEK), has a solution viscosity of 4500 to 7000 mPa●s(cP). Examples of a suitable cross-linker for cross-linking the aforementioned phenoxy resin include partially methylated melamine-formaldehyde resins of the type present in the CYMEL 300 series of partially methylated melamine-formaldehyde resin solutions (Cytec, Industries, Inc., West Paterson, N.J.) and, in particular, CYMEL 370 partially methylated melamine-formaldehyde resin solution (88±2% nonvolatiles, iBuOH solvent). Preferably, the solids of the aforementioned CYMEL 370 resin solution constitute no more than about 5%, by weight, of lacquer layer 23 (with the remainder of lacquer layer 23 being the aforementioned phenoxy resin) since the present inventors have discovered that amounts of CYMEL 370 in excess thereof tend to cause lacquer layer 23 to adhere undesirably to support portion 13 during label transfer.

One advantage to using a cross-linker of the aforementioned melamine-formaldehyde type, as opposed to other types of cross-linkers, is that said cross-linker does not require the use of a catalyst, but rather, is heat-activatable and that the heat-activation thereof can be achieved during the routine "post-curing" step (i.e., a heating of the decorated container at about 420° F. for about 20 minutes) to which the decorated container would ordinarily be subjected anyway following label transfer. It should be noted, however, that the present invention is not limited to such heat-activatable cross-linkers.

To form lacquer layer 23, a lacquer composition comprising the above-identified phenoxy lacquer resin, a suitable cross-linker and one or more suitable volatile solvents are deposited onto a desired area of skim coat 19, preferably by gravure printing or a similar technique. After deposition of the lacquer composition onto the desired area of skim coat 19, the volatile solvent(s) evaporate(s), leaving only the non-volatile components thereof to make up lacquer layer 23. In a preferred embodiment, the lacquer composition comprises about 20%, by weight, PKHH; about 1%, by weight, CYMEL 370 resin solution; about 59%, by weight, methyl ethyl ketone; and about 20%, by weight, toluene.

Ink design layer 25 of transfer portion 21 preferably comprises a polyester ink. Other types of ink, such as an acrylic ink and/or a polyamide ink, may also be suitable, depending upon the composition of first adhesive layer 27 and depending upon whether the label is to be used for applications other than for polyethylene-coated glass articles subjected to pasteurization conditions. Ink design layer 25 is formed in the conventional manner by depositing, by gravure printing or the like, an ink composition comprising a resin of the type described above, a suitable pigment or dye and one or more suitable volatile solvents onto one or more desired areas of lacquer layer 23. After application of the ink composition onto lacquer layer 23, the volatile solvent component(s) of the ink solvent system evaporate(s), leaving only the non-volatile ink components to form layer 25.

An example of a suitable resin for use in forming a polyester ink is ViTEL® 2700 (Shell Chemical Company, Akron, Ohio)—a copolyester resin having a high tensile strength (7000 psi) and a low elongation (4% elongation). A ViTEL® 2700-based polyester ink composition may comprise, by weight, 18% ViTEL® 2700, 6% pigment, 30.4% n-propyl acetate (NP Ac) and 45.6% toluene. As can readily be appreciated, ViTEL® 2700 is, by no means, the only polyester resin that may be used to formulate a polyester ink, and solvent systems, other than an NP Ac:toluene system, may be suitable for use with ViTEL® 2700, as well as with other polyester resins.

Adhesive layer 27 of transfer portion 21 preferably comprises an acrylic adhesive of the type present in a water-based adhesive emulsion or a water-based adhesive dispersion, it being understood that additional types of adhesives may also be suitable if label 11 is to be used for applications other than for use in decorating polyethylene-coated glass articles subjected to pasteurization conditions. Adhesive layer 27 is preferably formed by depositing, by gravure printing or the like, onto ink layer 25, exposed portions of lacquer layer 23 and a surrounding area of skim coat 19 an adhesive composition preferably comprising a water-based acrylic adhesive emulsion or dispersion, an alcohol and a suitable surfactant. The purpose of the alcohol and the surfactant in the aforementioned adhesive composition is to reduce the surface tension of the water-based adhesive emulsion or dispersion sufficiently to enable the composition to be printed onto the underlying layers in the form of a substantially continuous film of good printing quality. After deposition of the adhesive composition onto the underlying layers of label 11, the volatile components of the composition (e.g., water, alcohol) evaporate, leaving only the non-volatile solid components thereof to form layer 27.

A preferred example of the water-based acrylic emulsion is RHOPLEX® GL-618 emulsion (Rohm and Haas, Philadelphia, Pa.)—a water-based all-acrylic elastomeric polymer emulsion having a solids content of approximately 46.5–47.5%, by weight, a pH of about 7.5–9.5, a specific gravity of about 1.07 at 25° C., a weight of about 8.9 pounds/U.S. gallon, a Brookfield LVF Viscosity at 30 rpm, #2 spindle, of about 300–500 cps, a minimum film formation temperature of about 20° C. and a glass transition temperature of about 27° C. Other suitable examples may include JONCRYL 77 (S.C. Johnson & Son, Inc., Racine, Wis.)—an acrylic polymer emulsion having a solids content of approximately 45%, by weight, a pH of about 8.3, a weight of about 8.7 pounds/U.S. gallon, a Brookfield viscosity of about 450 cps and a glass transition temperature of about 21° C.; JONBOND® 751 (S.C. Johnson & Son, Inc., Racine, Wis.)—an acrylic emulsion having a solids content of approximately 46±1%, by weight, a pH of about 7.4–7.8, a weight of about 8.7 pounds/gallon, a Brookfield LVF viscosity of 700±200 cps and an activation temperature of approximately 93.3° C.; and SEQUABOND® VS 9010 (Sequa Chemicals, Inc., Chester, S.C.)—a polymer emulsion having a solids content of approximately 47%, a pH of about 8.5, a viscosity of about 600 cps, a weight of about 8.7 pounds/gallon and a glass transition temperature of about −30° C.

In a preferred embodiment, the adhesive composition comprises about 75%, by weight, of RHOPLEX® GL-618 emulsion; about 17.5%, by weight, of isopropyl alcohol; about 7.5%, by weight, of a 4% solution of $NH_4OH$; and about 1%, by weight, of Triton GR-5M dioctyl sodium sulfosuccinate surfactant (Union Carbide, Danbury, Conn.). The reason for the inclusion of the $NH_4OH$ solution in the aforementioned composition is to raise the pH of the composition from about 7–7.5 to preferably about 9–9.5 (preferably no greater than 10) since the inventors have discovered that, in the absence of the aforementioned pH adjustment, this particular composition does not print satisfactorily. The present inventors believe that other pH adjustment agents, other than the aforementioned $NH_4OH$ solution, may also be suitable. The present inventors also believe that, with respect to the aforementioned composition, the amount of Triton GR-5M preferably should not exceed about 1%, by weight, of the total composition and that the amount of isopropyl alcohol preferably should not exceed about 17.5%, by weight, of the total composition.

Second adhesive layer 29 preferably comprises a chlorinated polyolefin. (As can readily be appreciated, second adhesive layer 29 may not be necessary in those instances in which the article being decorated is not a polyethylene-coated glass article.) More preferably, said chlorinated polyolefin is of the type present in a water-based chlorinated polyolefin dispersion. Even more preferably, said chlorinated polyolefin is of the type present in Eastman CP 347W chlorinated polyolefin dispersion (Kingsport, Tenn.), Eastman CP 347W chlorinated polyolefin dispersion being a water-based chlorinated polyolefin dispersion having a pH at 25° C. of 9–10 and containing 20%, by weight, chlorinated polyolefin, and 25%, by weight, total solids and having 2-amino-2-methyl-1-propanol as a neutralizing amine.

In a preferred embodiment, layer 29 is formed by depositing, by gravure printing or the like, a composition comprising about 99.7%, by weight, Eastman CP 347W chlorinated polyolefin dispersion and about 0.3%, by weight, Henkel DSX 1514 polyurethane (Minneapolis, Minn.) onto adhesive layer 27. After application of the aforementioned composition onto layer 27, the volatile components of the composition evaporate, leaving only the non-volatile components thereof to form layer 29. Polyurethane is included in the aforementioned composition both to serve as a thickener to facilitate printing of the composition and as an anti-blocking agent to prevent layer 29 from adhering to the bottom of web 13 if label 11 is wound up into a roll. The present inventors envision that polyurethane could be replaced with other suitable agents.

Label 11 may be used in the conventional manner by contacting adhesive layer 29 to a desired article, such as a polyethylene-coated glass container, while applying sufficient heat to the bottom of carrier web 15 so as to cause transfer portion 21 (and, likely, a portion of skim coat 19) to be released from support portion 13 and so as to cause adhesive layer 29 to become heat-activated for bonding to the desired article. Post-curing and any other conventional processing steps would be performed in the usual manner.

The present inventors have noted that, when label 11 is used to decorate polyethylene-coated glass containers, a good degree of label adherence is achieved (i.e., about an F to an H, as measured by ASTM standard D3363-92a for film hardness on a substrate). In addition, the subject label adheres well to its container following repeated (up to 50) dishwashings. Additionally, the present inventors have noted that the present label adheres well to glass containers having nonuniform polyethylene coatings (and even to polyethylene coatings that are bare in spots and to completely bare glass containers), as well as to glass containers lubricated with stearate, oleic acid and the like, all without requiring silane-treatment. Moreover, the above-mentioned problem of open-copy hazing, typically encountered when labelled containers are subjected to pasteurization conditions, has been substantially ameliorated in the present case. Furthermore, the present inventors have noted that the present label possesses a high degree of chemical and abrasion resistance.

Figure 2:
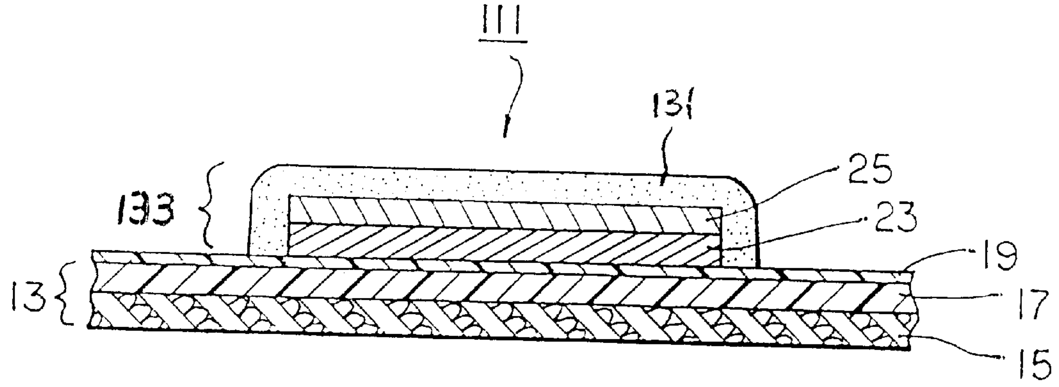
FIG. 2 is a schematic section view of a second embodiment of a heat-transfer label that is particularly well-suited for, but not limited to, use in decorating polyethylene-coated glass containers of the type that are subjected to pasteurization conditions, the heat-transfer label being constructed according to the teachings of the present invention.

Referring now to FIG. 2, there is shown a schematic section view of a second embodiment of a heat-transfer label that is particularly well-suited for use in, but not limited to, decorating polyethylene-coated glass containers of the type that are subjected to pasteurization conditions, the heat-transfer label being constructed according to the teachings of the present invention and being represented generally by reference numeral 111.

Label 111 is identical in all respects to label 11, except that, unlike label 11, label 111 does not include a first adhesive layer 27 and a second adhesive layer 29, but rather, includes an adhesive layer 131, layer 131 combining the chlorinated polyolefin of second adhesive layer 29 with the components of first adhesive layer 27. Transfer portion 133 of label 111 includes lacquer layer 23, ink layer 25 and adhesive layer 131. Label 111 is used in the same manner as label 11.

According to another embodiment of the present invention, label 11 is modified so as not to include layer 29. Instead, the chlorinated polyolefin of layer 29 is applied (by spraying, rolling, dipping, etc.) to a polyethylene-coated glass article (or to a bare glass article or to a glass article coated with a lubricant other than polyethylene) as a primer after the glass article has cooled completely. Alternatively, said chlorinated polyolefin could also be applied to a bare glass article as a cold-end treatment after the glass article has been formed but prior to its cooling. Such a cold-end treatment would obviate the need for the glass article to be treated with polyethylene since the chlorinated polyolefin would serve both as a lubricant and as an adhesion promoter.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A heat-transfer label comprising:

(a) a support portion; and (b) a transfer portion over said support portion for transfer of the transfer portion from the support portion to an article upon application of heat to the support portion while the transfer portion is placed into contact with the article, said transfer portion comprising:

(i) a protective lacquer layer, said protective lacquer layer comprising a cross-linked phenoxy resin;

(ii) an ink layer over said protective lacquer layer; and (iii) a first adhesive layer over said ink layer.

2. The heat-transfer label as claimed in claim 1 further comprising a wax skim coat, said wax skim coat being interposed between said support portion and said transfer portion.

3. The heat-transfer label as claimed in claim 1 wherein said cross-linked phenoxy resin is made by cross-linking a phenoxy resin having the following chemical structure:

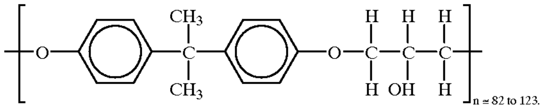

4. The heat-transfer label as claimed in claim 3 wherein said phenoxy resin, prior to cross-linking, has a solution viscosity of 4500 to 7000 mPa●s(cP) at 40% solids, by weight, in methyl ethyl ketone.

5. The heat-transfer label as claimed in claim 3 wherein said phenoxy resin is cross-linked using a melamine-formaldehyde resin.

6. The heat-transfer label as claimed in claim 5 wherein said melamine-formaldehyde resin is a partially methylated melamine-formaldehyde resin.

7. The heat-transfer label as claimed in claim 6 wherein said partially methylated melamine-formaldehyde resin constitutes no more than about 5%, by weight, of said protective lacquer layer.

8. The heat-transfer label as claimed in claim 2 wherein said first adhesive layer comprises an acrylic adhesive resin of the type present in a water-based adhesive emulsion or in a water-based adhesive dispersion.

9. The heat-transfer label as claimed in claim 8 wherein said water-based adhesive emulsion or dispersion is an all-acrylic elastomeric polymer emulsion having a solids content of approximately 46.5–47.5%, by weight, a pH of about 7.5–9.5, a specific gravity of about 1.07 at 25° C., a weight of about 8.9 pounds/U.S. gallon, a Brookfield LVF Viscosity at 30 rpm, #2 spindle, of about 300–500 cps, a minimum film formation temperature of about 20° C. and a glass transition temperature of about 27° C.

10. The heat-transfer label as claimed in claim 9 wherein said first adhesive layer is made by (i) depositing onto said ink and protective lacquer layers a composition comprising approximately 74%, by weight, of said all-acrylic elastomeric polymer emulsion, approximately 17%, by weight, of an alcohol, approximately 7%, by weight, of a pH adjustment agent to bring the pH of the composition into the range of about 9–9.5 and approximately 1%, by weight, of a suitable surfactant and (ii) evaporating the volatile components thereof.

11. The heat-transfer label as claimed in claim 8 further comprising a second adhesive layer over said first adhesive layer, said second adhesive layer comprising a chlorinated polyolefin.

12. The heat-transfer label as claimed in claim 2 further comprising a second adhesive layer over said first adhesive layer, said second adhesive layer comprising a chlorinated polyolefin.

13. The heat-transfer label as claimed in claim 2 wherein said first adhesive layer comprises a chlorinated polyolefin and an acrylic adhesive resin of the type present in a water-based adhesive emulsion or in a water-based adhesive dispersion.

14. A transfer portion of a heat-transfer label, said transfer portion comprising:

(a) a protective lacquer layer, said protective lacquer layer comprising a cross-linked phenoxy resin; and (b) an ink design layer positioned over said protective lacquer layer.

15. The transfer portion as claimed in claim 14 wherein said cross-linked phenoxy resin is made by cross-linking a phenoxy resin having the following chemical structure:

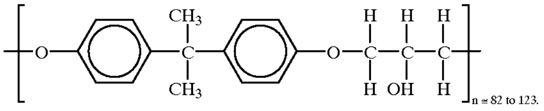

16. The transfer portion as claimed in claim 15 wherein said phenoxy resin, prior to cross-linking, has a solution viscosity of 4500 to 7000 mPa●s(cP) at 40% solids, by weight, in methyl ethyl ketone.

17. The transfer portion as claimed in claim 15 wherein said phenoxy resin is cross-linked using a melamine-formaldehyde resin.

18. The transfer portion as claimed in claim 17 wherein said melamine-formaldehyde resin is a partially methylated melamine-formaldehyde resin.

19. The transfer portion as claimed in claim 18 wherein said partially methylated melamine-formaldehyde resin constitutes no more than about 5%, by weight, of said protective lacquer layer.

20. The transfer portion as claimed in claim 14 further comprising an adhesive layer positioned over said ink design layer, said adhesive layer comprising a chlorinated polyolefin and an acrylic adhesive resin of the type present in a water-based adhesive emulsion or in a water-based adhesive dispersion.

21. The transfer portion as claimed in claim 14 further comprising an adhesive layer positioned over said ink design layer, said adhesive layer comprising a chlorinated polyolefin and an intermediate adhesive layer interposed between said ink design layer and said chlorinated polyolefin-containing adhesive layer, said intermediate adhesive layer comprising an acrylic adhesive resin of the type present in a water-based adhesive emulsion or in a water-based adhesive dispersion.

* * * * *